(12) United States Patent
Wan

(10) Patent No.: US 7,926,952 B2
(45) Date of Patent: Apr. 19, 2011

(54) REAR PROJECTION DISPLAY DEVICE

(75) Inventor: Hong Wan, HangZhou (CN)

(73) Assignee: Asia Optical Co., Inc, Taichung (TW)

( * ) Notice: Subject to any disclaimer, the term of this patent is extended or adjusted under 35 U.S.C. 154(b) by 919 days.

(21) Appl. No.: 11/762,554

(22) Filed: Jun. 13, 2007

(65) Prior Publication Data
US 2008/0055559 A1   Mar. 6, 2008

(30) Foreign Application Priority Data

Aug. 31, 2006  (TW) ............................... 95132253 A

(51) Int. Cl.
*G03B 21/22* (2006.01)
(52) U.S. Cl. .................. 353/37; 353/51; 353/78
(58) Field of Classification Search ............. 353/37, 353/50, 51, 64, 73, 77, 78
See application file for complete search history.

(56) References Cited

U.S. PATENT DOCUMENTS

| 6,839,042 | B2 * | 1/2005 | Conemac et al. | 345/32 |
| 7,090,353 | B1 * | 8/2006 | Bay | 353/31 |
| 7,530,694 | B2 * | 5/2009 | Lowe | 353/78 |
| 2005/0146786 | A1 * | 7/2005 | Ikeda et al. | 359/460 |
| 2007/0139623 | A1 * | 6/2007 | Hisada et al. | 353/78 |
| 2008/0055559 | A1 * | 3/2008 | Wan | 353/34 |
| 2008/0151199 | A1 * | 6/2008 | Wu et al. | 353/102 |
| 2009/0141191 | A1 * | 6/2009 | Nojima et al. | 348/744 |

* cited by examiner

Primary Examiner — John R Lee

(57) ABSTRACT

A rear projection display device (1) includes a screen (10), a projection engine (11) for producing an image light beam, a projection lens (12), and reflectors (13, 14) for projecting the image light beam onto the screen. The projection engine and the projection lens are positioned in rear of the screen within a substantially central portion of the display device. The reflectors are composed of two symmetrically arranged groups of first and second reflectors. The first and second reflectors in each group form a certain angle with each other. The first reflectors divide the image light beam from the projection lens into two image sub-beams, and then reflect them onto the respective second reflectors. The second reflectors reflect the two image sub-beams onto the screen for display a combined single image. By means of the image light beam division and two times of reflection by the reflectors, the depth of the display device is significantly reduced. The height of the display device is also significantly reduced as the projection engine is positioned in rear of the screen. When viewed from a front side of the display device, substantially only the screen can be seen.

22 Claims, 4 Drawing Sheets

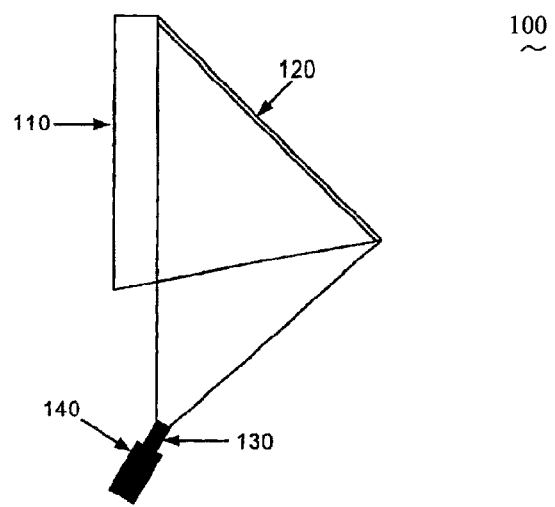
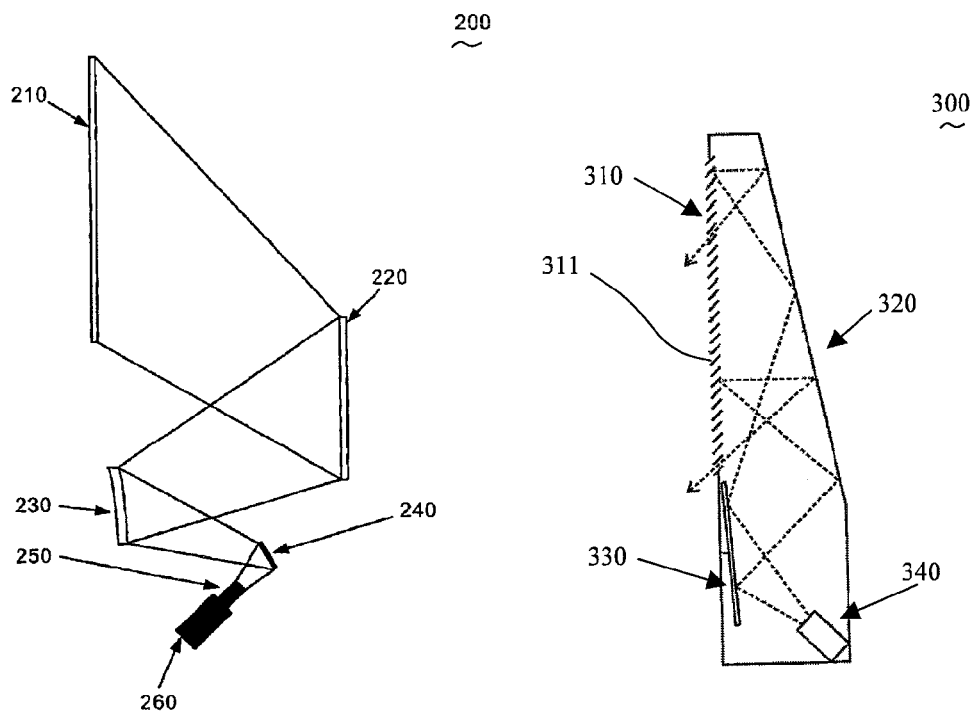
FIG. 1
(PRIOR ART)
FIG. 2
(PRIOR ART)
FIG. 3
(PRIOR ART)

REAR PROJECTION DISPLAY DEVICE

BACKGROUND OF THE INVENTION

1. Field of the Invention

The present invention relates to a rear projection display device, and particularly relates to a rear projection display device with reduced height and depth. When viewing from a front side of the rear projection display device, substantially only the screen can be seen.

2. Description of Prior Art

Various types of display devices have been widely adopted in ordinary life. Exemplary display devices include CRT (cathode ray tube) displays, rear projection displays, plasma displays, LCDs (liquid crystal display) and so on.

Recently, with the development of technology and increase of requirement, it has become a general tendency that a display device is designed to have a large-sized screen. Numerous attempts have been made to design such a display device with a large-sized screen. Among the various types of display devices, a CRT display with a screen size more than 40 inches (measured diagonally) become impractical because of the size and weight limitations of the CRT technology. The LCD display can be designed to have a screen size more than 50 inches, but the cost is very expensive. Currently, only the rear projection display and the plasma display are available at a reasonable cost while providing a screen size more than 50 inches. In comparison with a plasma display, a conventional rear projection display is large in volume. In addition, beneath the screen of the rear projection display, a significant amount of additional space is generally provided to accommodate an optical engine and a projection lens. Nevertheless, the rear projection display has an advantage of reduced cost over the plasma display, especially when a screen size larger than 60 inches is required.

FIG. 1 is a schematic view of the configuration of a conventional rear projection display 100 that is widely adopted. This rear projection display 100 includes a projection engine 140, a projection lens 130, a rear reflector 120 and a screen 110. The image produced by the projection engine 140 is transmitted through the projection lens 130, and then is reflected onto the screen 110 by the rear reflector 120. This conventional configuration leads to a significant depth of the display device. For example, for a 60-inch screen, the depth of the rear projection display 100 would be 24 inches. Further, since the projection engine 140 is disposed underneath the screen 110, a significant amount of additional space must be provided beneath the screen 110 so as to accommodate the projection engine 140 and the projection lens 130.

FIG. 2 is a schematic view of the configuration of an improved display 200 employs three reflectors 220, 230 and 240. An image light beam produced by a projection engine 260 is first transmitted through a projection lens 250, and then is sequentially reflected by the reflectors 240, 230 and 220 to project onto a screen 210. To enlarge the projection angle, one of the three reflectors 220, 230 and 240 is configured as an aspheric reflector. This improved rear projection display 200 has a reduced depth, which is achieved by reflecting the projected image light beam three times. In comparison with the display 100 in FIG. 1, the depth of this improved display 200 can be reduced to 12 inches for a 60-inch screen. However, this improved conventional display 200 also has a disadvantage that the cost is very high. This is caused by the exact adjustment of three-time reflection, the production of an aspheric reflector and the compensation for induced image distortion. In addition, the adoption of three-time reflection requires that the projection engine 260 be disposed at a position further below the screen 210 than that of the projection engine 140 in FIG. 1. This inevitably increases the height of the display 200. When viewed from a front side of the display device, the proportion of the screen 210 to the front side of the display device is even smaller than that of the configuration in FIG. 1.

FIG. 3 is a schematic view of the configuration of another improved conventional rear projection display 300 with a further reduced depth. This conventional rear projection display 300 employs a front small reflector 330 positioned below a screen 310, and a rear large reflector 320 in rear of the screen 310. An image light beam produced by the projection engine 340 is first reflected by the front small reflector 330, and then is reflected by the rear large reflector 320 toward the screen 310 for display. Particularly, the screen 310 is designed to include a plurality of angularly discriminating reflective elements 311. These reflective elements 311 are adapted to reflect light incident on the screen 310 from a first angle toward the rear reflector 320, and to allow light incident on the screen 310 from a second angle to be transmitted through the screen 310 for display. By employment of these particular reflective elements 311 on the screen 310 and the large rear reflector 320, this conventional display 300 can be made slim. Alternatively, to reduce the display depth, the screen 310 may be configured to reflect light of one polarity but transmit light of the other polarity. Polarized light from the projection engine 340 is first reflected off the screen 310 toward a polarization-rotating rear mirror, and then reflected off the rear mirror, which rotates the polarization 90 degrees so that the light can pass through the screen 310. However, both the above solutions require a particularly designed screen and the fine adjustment of component positions, which results in a high cost and thus is adverse to mass production at a low cost. Further, when viewed from a front side of the display device, the height of the display 300 is still considerable, since the projection engine 340 is positioned below the screen 310.

Accordingly, to overcome the above disadvantages in the prior art and satisfy the requirement for a compact display device, it is desired to provide an improved rear projection display device that has a reduced volume and therefore a low cost.

SUMMARY OF THE INVENTION

An object of the present invention is to provide a rear projection display device having a reduced volume and an increased proportion of the screen to the whole front side surface of the display device. When viewing from the front side of the rear projection display device, substantially only the screen can be seen.

To achieve the above object of the present invention, a rear projection display device in accordance with the present invention includes a screen, a projection engine, a projection lens and a plurality of reflectors. The projection engine is located in rear of the screen and is positioned right on a horizontal centerline of the screen. The projection engine is adapted to produce an image and project the image in a direction away from the screen. The projection lens is positioned right in rear of the projection engine for transmitting the image light beam from the projection engine. The reflectors are located in rear of the projection lens and are symmetrically divided into two groups by the horizontal centerline of the screen. The image light beam from the projection lens is thus separated into two portions by reflection of the two groups of reflectors before reaching the screen. Each group of reflectors is composed of a first reflector and a second reflector forming a certain angle with the first reflector. The first reflector reflects the image light beam from the projection lens on the second reflector, and the second reflector finally reflects the incident image light beam on the screen.

In comparison with the prior art, the projection engine and the projection lens of the present rear projection display device are both positioned in rear of the screen and right on the horizontal centerline of the screen. Further, the two groups of first and second reflectors are symmetrically located on respective opposite sides of the horizontal centerline of the screen to separate the image light beam from the projection lens into two portions for display by the screen. By this unique arrangement, the height of the present rear projection display device can be significantly reduced, whereby substantially only the screen of the present display device can be seen when viewed from the front side by the viewer. This overcomes the disadvantages of a conventional rear projection display device that has a relatively small proportion of the screen to the whole front side surface thereof. Further, in comparison with the conventional design, the depth of the present display device is also decreased.

BRIEF DESCRIPTION OF THE DRAWINGS

The present invention may best be understood through the following description with reference to the accompanying drawings, in which:

FIG. 1 is a schematic view of the configuration of a conventional rear projection display device;

FIG. 2 is a schematic view of the configuration of another conventional rear projection display device;

FIG. 3 is a schematic view of the configuration of a further conventional rear projection display device;

DETAILED DESCRIPTION OF THE PREFERRED EMBODIMENT

Figure 4:
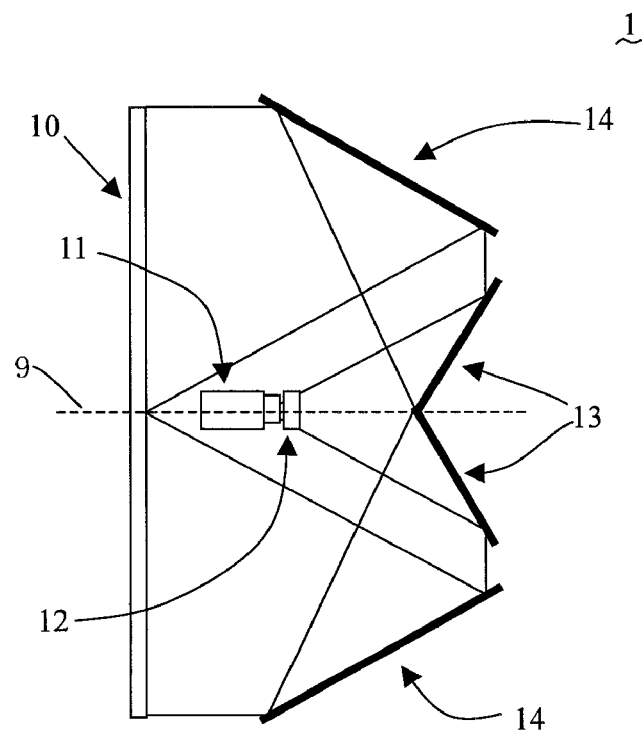
FIG. 4 is a schematic view of the configuration of a rear projection display device in accordance with the present invention.

Referring to FIG. 4, a schematic view of the configuration of a rear projection display device 1 in accordance with the present invention is shown. The rear projection display device 1 includes a screen 10 for displaying an image, a projection engine 11 located in rear of the screen 10 for producing and projecting an image light beam, a projection lens 12 located at a light exit side of the projection engine 11, and a pair of first reflectors 13 and a pair of second reflectors 14 for reflecting the image light beam from the projection lens 12 onto the screen 10 for display. The projection engine 11 and the projection lens 12 are both positioned on a horizontal centerline 9 of the screen 10 that is dashed in FIG. 4. One of the first reflectors 13 and one of the second reflectors 14 are located on an upper side of the horizontal centerline 9 of the screen 10, and the other of the first reflectors 13 and the other of the second reflectors 14 are located on a lower side of the horizontal centerline 9 of the screen 10. The pair of first reflectors 13 is symmetrically located on respective upper and lower sides of the horizontal centerline 9 of the screen 10, and the pair of second reflectors 14 is also symmetrically located on respective upper and lower sides of the horizontal centerline 9 of the screen 10 but is distant from the horizontal centerline 9. The pair of first reflectors 13 forms a certain angle with each other, and each second reflector 14 also forms a certain angle with the first reflector 13 on the same side of the horizontal centerline 9. Thus, the two first reflectors 13 and the two second reflectors 14 together form substantially a capital letter "M".

The image light beam projected by the projection engine 11 is first transmitted through the projection lens 12, and then is incident onto the two first reflectors 13. The image light beam is divided by the two first reflectors 13 into two separate upper and lower sub-beams. The two sub-beams are then respectively projected onto upper and lower portions of the screen 10 by the two second reflectors 14. Finally, the two sub-beams are combined as a single image on the screen 10. In the present rear projection display device, the positions of the projection engine 11, the projection lens 12, the reflectors 13, 14 and the screen 10 are suitably arranged in such a manner that the projection engine 11 is just located within a vacant space of the light path of the image light rays. In this way, the light path of the image light rays is not obscured by the projection engine 11 to adversely affect the image display.

Figures 5, 6:
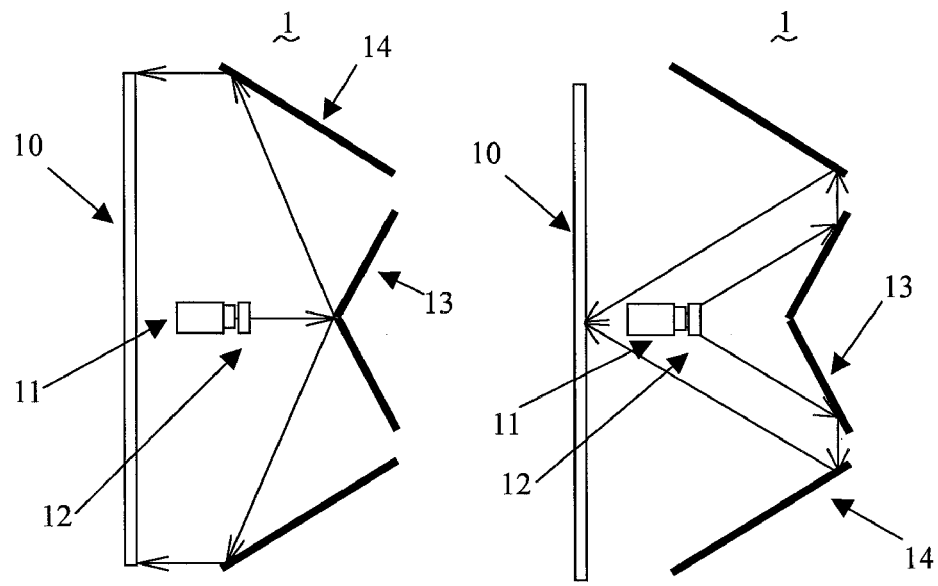
FIG. 5 illustrates the light path of image rays incident on the outer periphery of a screen of the present rear projection display device.
FIG. 6 illustrates the light path of image light rays incident on the center of a screen of the present rear projection display device.

FIG. 5 illustrates the light path of image light rays incident on the opposite edges of the screen 10. The image light rays from the center of the projection lens 12 are first incident on the two first reflectors 13 and are divided into two separate parts. Each separate part is incident upwards or downwards onto an upper end or a lower end (proximate to the screen 10) of a corresponding second reflector 14 on the same side of the horizontal centerline 9 of the screen 10. The second reflectors 14 then horizontally reflect the respective two separate parts of the image light rays on upper and lower edges of the screen 10.

FIG. 6 illustrates the light path of image light rays incident on the center of the screen 10. The image light rays from the periphery of the projection lens 12 are first projected onto the two first reflectors 13, and then incident upwards or downwards from the two first reflectors 13 onto a lower edge or an upper edge (away from the screen 10) of the two second reflectors 14. The image light rays incident onto the screen 10 from the two second reflectors 14 are finally combined together as a single image for display.

Figure 7:
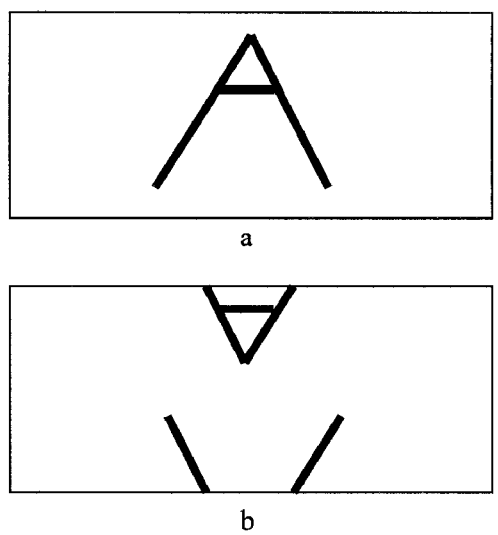
FIG. 7 illustrates the image patterns respectively produced by a projection engine and displayed by the screen of the present rear projection display device.

As described above, the image light rays exit from the center of the projection lens 12 are divided by the two first reflectors 13 into two separate upper and lower parts. The two parts are then incident respectively onto the two second reflectors 14, which rotate the incident light rays by 180 degrees before projecting onto the screen 10. Accordingly, to obtain a desired image on the screen 10, the screen 10 and the image pattern should be specially designed. For example, in order to display a desired image pattern "A" on the screen 10 as shown in an upper portion "a" of FIG. 7, the image pattern produced by the projection engine 11 should be in a form as that shown in a lower portion "b" of FIG. 7. That is, the desired image pattern "A" should be divided and inverted into two separate sections in the projection engine 11 as those shown in the lower portion "b" of FIG. 7. After reflection of the two second reflectors 14, the two separate inverted sections of the image pattern from the projection engine 11 are rotated by 180 degrees and are then combined in the screen 10. Thus, the original desired image pattern "A" can be displayed on the screen 10. It should be noted that, in consideration of the system tolerance, the division of the image pattern "A" may not be exactly in half, so that an error caused by the system tolerance such as the angular tolerance of the first and second reflectors 13, 14 can be compensated. In addition, as the separated image light rays are combined in the middle of the screen 10, the electronic adjustment function should be provided so as to compensate the image combination error in the middle of the screen 10.

It should be understood that, the image pattern produced by the projection engine 11 may also be in the form of two divided sections that are normally oriented, not inverted. In this case, to obtain an image pattern in the desired orientation for display by the screen 10, an additional element should be provided between the projection lens 12 and the first reflectors 13 to invert the orientations of the two divided sections of the projected image pattern before they reach the first reflectors 13.

Figure 8:
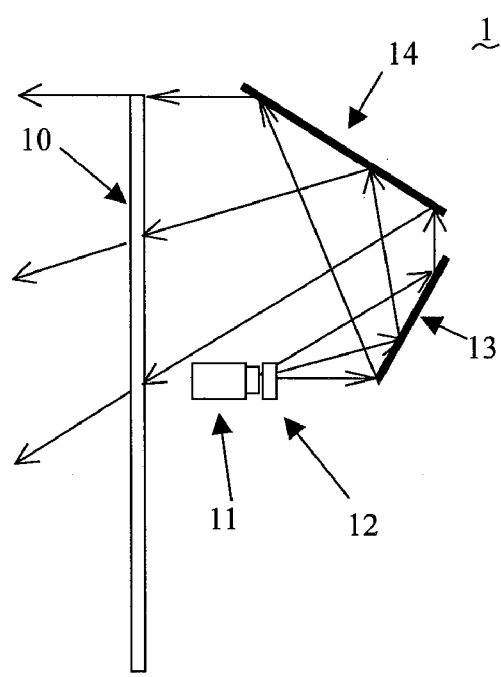
FIG. 8 illustrates the light path of image light rays incident on a non-optimized screen of the present rear projection display device, wherein a group of first and second reflectors is removed for simplicity.
Figure 9:
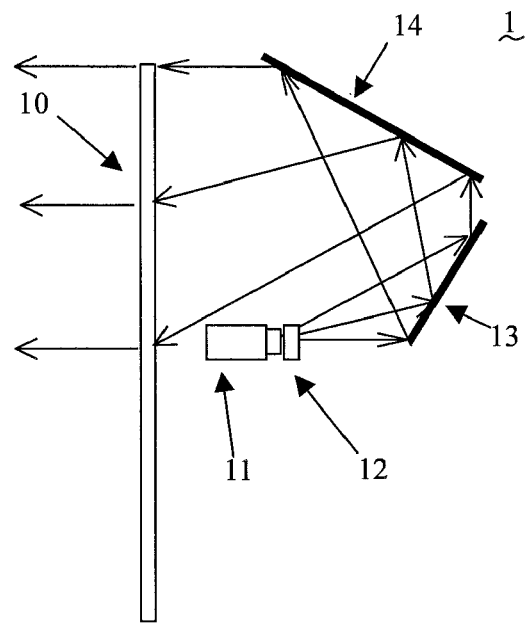
FIG. 9 illustrates the light path of image light rays incident on an optimized screen of the present rear projection display device, wherein a group of first and second reflectors is removed for simplicity.

To optimize the present rear projection display device, the screen 10 should be specially designed to compensate the variations of the incident angles of the image light rays after separation of the light path. As shown in FIG. 8 that only includes one first reflector 13 and one second reflector 14 for simplicity purpose, if the screen 10 is in the form of a scattering screen, only the image light rays exiting the outer periphery of the screen 10 is at a normal angle with respect to the screen plane, and the image light rays exiting the other portions of the screen 10 are at a non-normal angle. Specifically, the more adjacent to the outer periphery of the screen 10, the greater the relative angle between the exiting light rays and the screen plane, and the more adjacent to the center of the screen 10, the smaller the relative angle between the exiting light rays and the screen plane. Consequently, the thus combined image that is displayed by such a scattering screen 10 is dissatisfactory. What is desired is that all the image light rays exit the screen 10 substantially at a normal angle relative to the screen plane, which is shown in FIG. 9. In order to obtain such an effect, the screen 10 should be specially designed. In a preferred embodiment of the present invention, such an effect is achieved by adopting a Fresnel screen that converts the image light rays incident from the second reflectors 14 to have predetermined optical directional characteristics. Further, when a relatively converged image light beam exiting the screen 10 is desired, stripes on the screen 10 should be properly adjusted.

Figure 10:
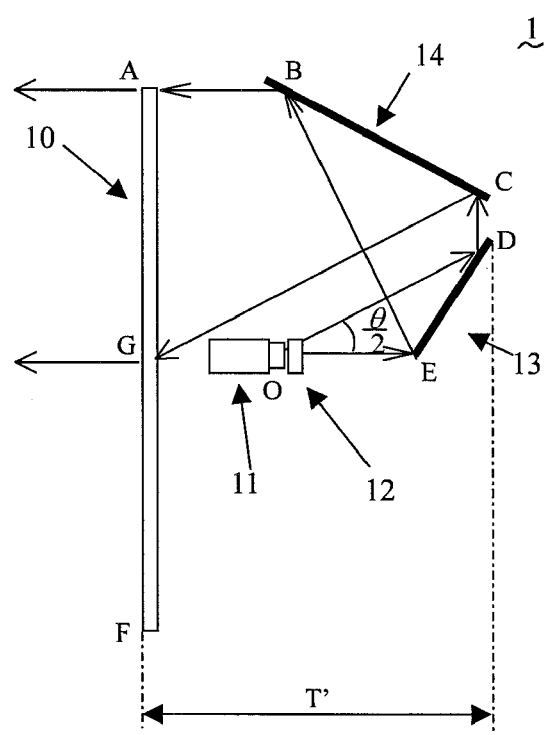
FIG. 10 is similar to FIG. 9 but showing alphabetic characters indicated.

FIG. 10 is a similar to FIG. 9 but shows the alphabetic characters indicated for calculation of the depth of the present display device. Among the alphabetic characters, "θ" denotes the projection angle of the image light beam from the projection lens 12, "AF" denotes the height of the screen 10, "G" denotes the center point of the screen 10, "O" denotes the exit pupil point of the projection lens 12, "GO" denotes the distance between the screen 10 and the exit pupil point of the projection lens 12, "OE" denotes the distance between the exit pupil point of the projection lens 12 and a proximate point of the first reflector 13, "AB" denotes the distance between the screen 10 and a light incident point at the upper end of the second reflector 14, "BC" denotes the length of the second reflector 14, and "CD" denotes the path length of the light ray between the proximate ends of the first and second reflectors 13, 14. In the preferred embodiment, BC is set to be perpendicular to DE. GO is set to be equal to AB in length. That is, the distance between the projection lens 12 and the screen 10 is equal to the distance between the screen 10 and a light incident point B of the image light beam on an end of the second reflector 14 proximate to the screen 10.

It can be determined from FIG. 10 that the angles ∠ABC and φOED are respectively given by:

$$\angle ABC = 180 - \frac{\theta}{2} \tag{1}$$

$$\angle OED = a\tan(-2\sin(\theta)) \tag{2}$$

Further, the lengths OE, DE and BC are respectively given by:

$$OE = \frac{AF}{2}c\tan\left(\frac{\theta}{2}\right) - \frac{AF}{2\sin(\theta)} - AB \tag{3}$$

$$DE = \frac{AF}{4\cos\left(\frac{\theta}{2}\right)} - \frac{AB}{2\cos\left(\frac{\theta}{2}\right)c\tan\left(\frac{\theta}{2}\right) - \frac{1}{\sin\left(\frac{\theta}{2}\right)}} \tag{4}$$

$$BC = \frac{AF}{4\sin\left(\frac{\theta}{2}\right)} - \frac{AB}{2\cos\left(\frac{\theta}{2}\right)} \tag{5}$$

From the above equations (1) to (5), the depth T' of the present display device can be determined by the following equation:

$$T' = \frac{AB}{2} + \frac{AF}{4}c\tan\left(\frac{\theta}{2}\right) \tag{6}$$

Accordingly, by use of the above-described rear projection construction, such as in a rear projection television, the depth of the rear projection display device can be significantly reduced.

When applying the above-described rear projection construction in a rear projection television that has a screen size of 60 inches measured diagonally, the structural parameters can be preset as follows. The diagonal angle of view of the projection lens 12 is set to be 104°, and the vertical angle of view of the projection lens 12 is set to be 64°. The diagonal angle of view, which is adapted to indicate the maximum projection capability of the rear projection television within a certain distance, is defined by the angle between lines connecting the center of the rear of the television with the diagonal corners of the screen 10. The vertical angle of view, which is adapted to indicate the maximum projection image of the rear projection television within a certain distance, is defined by the angle between lines connecting the center of the rear of the television with the respective center points at the top and bottom of the front side surface of the screen 10. The distance AB shown in FIG. 10 is set to be 5.9 inches, the length DE of the first reflector 13 is set to be 1.5 inches, the length BC of the second reflector 14 is set to be 10.4 inches, and the distance OE is set to be 1.3 inches. By such an arrangement, the depth of a rear projection television employing the present invention can be reduced to 14.7 inches, which is significantly smaller than 24 inches of a conventional projection television having a screen of the same size. However, it should be understood that the above settings of the structural parameters are only for illustration purpose without limiting the scope of the present invention, and proper adjustment may be made by one of ordinary skill in the art to meet actual requirements.

Each first and second reflector 13, 14 may be in the form of a planar reflector or an aspheric reflector. By finely designing the curvature of the surface of the aspheric reflector in cooperation with the projection lens 12, a reduced size of the present display device can be obtained. In the embodiment, the combination of two aspheric reflectors and two planar reflectors may be adopted, or all the reflectors may be made aspheric. However, the present invention is not so limited.

The projection lens 12 may be of a dual-lens structure, whereby the first reflectors 13 can be omitted. Thus, the image light beams from the dual-lens structure are directly incident onto the second reflectors 14 and then projected onto the screen 10.

Further, to enhance the assembly accuracy of the first and second reflectors 13, 14, the two first reflectors 13 also may be replaced by a triangular prism that is coated with antireflection films on corresponding surfaces.

When it is necessary to replace a light source such as a xenon lamp in the projection engine 11, additional space may be provided on opposite sides of the projection lens 12 for replacement. The light source in the projection engine 12 may be in the form of an LED (Laser Electric Diode), so that there is no maintenance required as the LED has a long life. Further, since the projection engine 11 is disposed at an approximately central position of the present display device, heat dissipation is facilitated and the service life of the projection engine 11 is thereby elongated.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A rear projection display device, comprising:
   a screen displaying an image and defining a horizontal centerline;
   a projection engine positioned behind the screen and having an exit side, the projection engine producing the image, which is projected in the form of an image light beam via the exit side and is projected away from the screen;
   a projection lens positioned at the exit side of the projection engine, the projection lens receiving and transmitting the image light beam from the projection engine; and
   two groups of reflectors positioned behind the screen, the two groups of reflectors being symmetrically positioned on respective opposite sides of the horizontal centerline of the screen and dividing the image light beam from the projection lens into two image sub-beams for respectively projecting onto the screen to display a continuous image, each group of reflectors comprising:
      a first reflector receiving and reflecting the image light beam from the projection lens; and
      a second reflector forming an angle with the first reflector, the second reflector receiving the image light beam reflected from the first reflector and projecting the image light beam onto the screen.

2. The rear projection display device as claimed in claim 1, wherein the first and second reflectors are planar reflectors.

3. The rear projection display device as claimed in claim 1, wherein the first and second reflectors are aspheric reflectors.

4. The rear projection display device as claimed in claim 1, wherein one of the first and second reflectors of each group is an aspheric reflector.

5. The rear projection display device as claimed in claim 1, wherein each image sub-beam divided from the image light beam carries an image inverted relative to a desired image to be displayed on the screen.

6. The rear projection display device as claimed in claim 5, wherein the projection engine is positioned on the horizontal centerline of the screen.

7. The rear projection display device as claimed in claim 6, wherein a part of the image light beam reflected by the said first reflector is incident onto an end of said second reflector away from the screen and then is reflected onto the center of the screen by said second reflector.

8. The rear projection display device as claimed in claim 1, wherein the first and second reflectors are perpendicularly arranged relative to each other.

9. The rear projection display device as claimed in claim 1, wherein the distance between the projection lens and the screen is equal to the distance between the screen and a light incident point of the image light beam on an end of said second reflector proximate to the screen.

10. A rear projection display device having a front side surface for display, comprising:
    a screen displaying an image and defining a horizontal centerline;
    a projection engine positioned behind the screen on the horizontal centerline of the screen and having an exit side, the projection engine producing the image, which is projected in the form of an image light beam via the exit side and is projected away from the exit side;
    a projection lens positioned at the exit side of the projection engine, the projection lens receiving and transmitting the image light beam from the projection engine;
    a pair of first reflectors positioned behind the screen and forming an angle with each other, each first reflector receiving and reflecting a part of the image light beam from the projection lens; and
    a pair of second reflectors positioned on respective opposite sides of the pair of first reflectors and each forming an angle with an adjacent first reflector, each second reflector receiving the part of the image light beam from the adjacent first reflector and projecting it onto the screen.

11. The rear projection display device as claimed in claim 10, wherein the adjacent first and second reflectors are perpendicularly arranged relative to each other.

12. The rear projection display device as claimed in claim 11, wherein the distance between the projection lens and the screen is equal to the distance between the screen and a light incident point of the image light beam on an end of said second reflector proximate to the screen.

13. The rear projection display device as claimed in claim 12, satisfying the following equation:

$$OE = \frac{AF}{2}c\tan\frac{\theta}{2} - \frac{AF}{2\sin(\theta)} - AB$$

where OE denotes the distance between an exit pupil point of the projection lens and a point of said first reflector proximate to the projection lens, $\theta$ denotes the projection angle of the image light beam from the projection lens, AF denotes the height of the screen, and AB denotes the distance between the screen and a light incident point of the image light beam at an upper end of said second reflector.

14. The rear projection display device as claimed in claim 12, satisfying the following equation:

$$DE = \frac{AF}{4\cos\frac{\theta}{2}} - \frac{AB}{2\cos\frac{\theta}{2}c\tan\frac{\theta}{2}\frac{1}{\sin\frac{\theta}{2}}}$$

where DE denotes the length of said first reflector, θ denotes the projection angle of the image light beam from the projection lens, AF denotes the height of the screen, and AB denotes the distance between the screen and a light incident point of the image light beam at an upper end of said second reflector.

15. The rear projection display device as claimed in claim 12, satisfying the following equation:

$$BC = \frac{AF}{4\sin\left(\frac{\theta}{2}\right)} - \frac{AB}{2\cos\left(\frac{\theta}{2}\right)}$$

where BC denotes the length of said second reflector, θ denotes the projection angle of the image light beam from the projection lens, AF denotes the height of the screen, and AB denotes the distance between the screen and a light incident point of the image light beam at an upper end of said second reflector.

16. The rear projection display device as claimed in claim 12, satisfying the following equation:

$$T' = \frac{AB}{2} + \frac{AF}{4}c\tan\frac{\theta}{2}$$

where T' denotes the depth of the rear projection display device, θ denotes the projection angle of the image light beam from the projection lens, AB denotes the distance between the screen and a light incident point of the image light beam at an upper end of said second reflector, and AF denotes the height of the screen.

17. The rear projection display device as claimed in claim 10, wherein the first and second reflectors are aspheric reflectors.

18. The rear projection display device as claimed in claim 10, wherein the first and second reflectors are planar reflectors.

19. The rear projection display device as claimed in claim 10, wherein the first reflectors or the second reflectors are aspheric reflectors.

20. The rear projection display device as claimed in claim 10, wherein the first pair of reflectors and the second pair of reflectors together form substantially a capital letter "M".

21. The rear projection display device as claimed in claim 10, wherein each part of the image light beam reflected by said first reflector carries an image inverted relative to a desired image to be displayed on the screen.

22. The rear projection display device as claimed in claim 21, wherein a part of the image light beam reflected by the said first reflector is incident onto an end of said second reflector away from the screen and then is reflected onto the center of the screen by said second reflector.

* * * * *